United States Patent
Delcamp et al.

(10) Patent No.: US 12,515,996 B2
(45) Date of Patent: Jan. 6, 2026

(54) METHOD FOR COATING AT LEAST ONE FIBER WITH A BORON NITRIDE INTERPHASE

(71) Applicants: SAFRAN CERAMICS, Le Haillan (FR); CENTRE NATIONAL DE LA RECHERCHE SCIENTIFIQUE, Paris (FR); UNIVERSITE DE BORDEAUX, Bordeaux (FR); INSTITUT POLYTECHNIQUE DE BORDEAUX, Talence (FR)

(72) Inventors: Adrien Delcamp, Moissy-Cramayel (FR); Cyril Aymonier, Begles (FR); Nicolas Biscay, Bordeaux (FR)

(73) Assignees: SAFRAN CERAMICS, Le Haillan (FR); CENTRE NATIONAL DE LA RECHERCHE SCIENTIFIQUE, Paris (FR); UNIVERSITE DE BORDEAUX, Bordeaux (FR); INSTITUT POLYTECHNIQUE DE BORDEAUX, Talence (FR)

( * ) Notice: Subject to any disclaimer, the term of this patent is extended or adjusted under 35 U.S.C. 154(b) by 0 days.

(21) Appl. No.: 18/572,610

(22) PCT Filed: Jun. 13, 2022

(86) PCT No.: PCT/FR2022/051129
§ 371 (c)(1),
(2) Date: Dec. 20, 2023

(87) PCT Pub. No.: WO2022/269164
PCT Pub. Date: Dec. 29, 2022

(65) Prior Publication Data
US 2024/0286963 A1 Aug. 29, 2024

(30) Foreign Application Priority Data
Jun. 23, 2021 (FR) .................................. 2106671

(51) Int. Cl.
*C04B 35/628* (2006.01)
*C04B 35/626* (2006.01)
(Continued)

(52) U.S. Cl.
CPC .. *C04B 35/62868* (2013.01); *C04B 35/62675* (2013.01); *C04B 35/6268* (2013.01);
(Continued)

(58) Field of Classification Search
CPC .............. C04B 35/80; C04B 35/62836; C04B 41/5353
See application file for complete search history.

(56) References Cited

U.S. PATENT DOCUMENTS 5,194,409 A 3/1993 Sugihara
5,629,053 A 5/1997 Treichel et al.
(Continued)

FOREIGN PATENT DOCUMENTS

CN 101928915 A 12/2010
CN 105463403 A 4/2016
(Continued)

OTHER PUBLICATIONS

Sun et al., "Controllable coating of boron nitride on ceramic fibers by CVD at low temperature," 2017, Ceramics International, pp. 1509-1516. (Year: 2017).*
(Continued)

*Primary Examiner* — Robert A Vetere
(74) *Attorney, Agent, or Firm* — Pillsbury Winthrop Shaw Pittman LLP

(57) ABSTRACT

A method for coating at least one fibre with a boron nitride interphase, includes treating the at least one fibre with a
(Continued)

treatment medium containing ammonia borane and having a temperature of 100° C. or higher and a pressure of 1 bar or higher.

9 Claims, 3 Drawing Sheets

(51) Int. Cl.
    *C04B 35/80*     (2006.01)
    *D06M 10/00*     (2006.01)
    *D06M 10/06*     (2006.01)
    *D06M 101/16*     (2006.01)

(52) U.S. Cl.
    CPC ........ *C04B 35/62886* (2013.01); *C04B 35/80* (2013.01); *D06M 10/003* (2013.01); *D06M 10/06* (2013.01); *C04B 2235/5244* (2013.01); *C04B 2235/616* (2013.01); *D06M 2101/16* (2013.01)

(56) References Cited

U.S. PATENT DOCUMENTS

| | | | |
|---|---|---|---|
| 6,284,358 B1 | 9/2001 | Parlier et al. | |
| 6,428,399 B1* | 8/2002 | Tanabe | B24B 37/042 451/64 |
| 2006/0147692 A1* | 7/2006 | Kmetz | C04B 35/62868 428/292.1 |
| 2014/0182823 A1* | 7/2014 | Cumberland | F28F 13/185 428/221 |

FOREIGN PATENT DOCUMENTS

| | | |
|---|---|---|
| CN | 107161960 A | 9/2017 |
| CN | 110240488 A | 9/2019 |
| CN | 108892521 B | 4/2021 |
| FR | 2 757 848 A1 | 7/1998 |
| JP | 2017-088418 A | 5/2017 |
| KR | 10-2014-0115868 A | 10/2014 |

OTHER PUBLICATIONS

International Search Report as issued in International Patent Application No. PCT/FR2022/051129, dated Nov. 3, 2022.

Sun, N., et al., "Controllable coating of boron nitride on ceramic fibers by CVD at low temperature," Ceramics International, vol. 43, No. 1, Oct. 2016, XP055384448, pp. 1509-1516.

First Office Action as issued in Chinese Patent Application No. 202280049887.6, dated Nov. 11, 2025.

* cited by examiner

[Fig. 1]
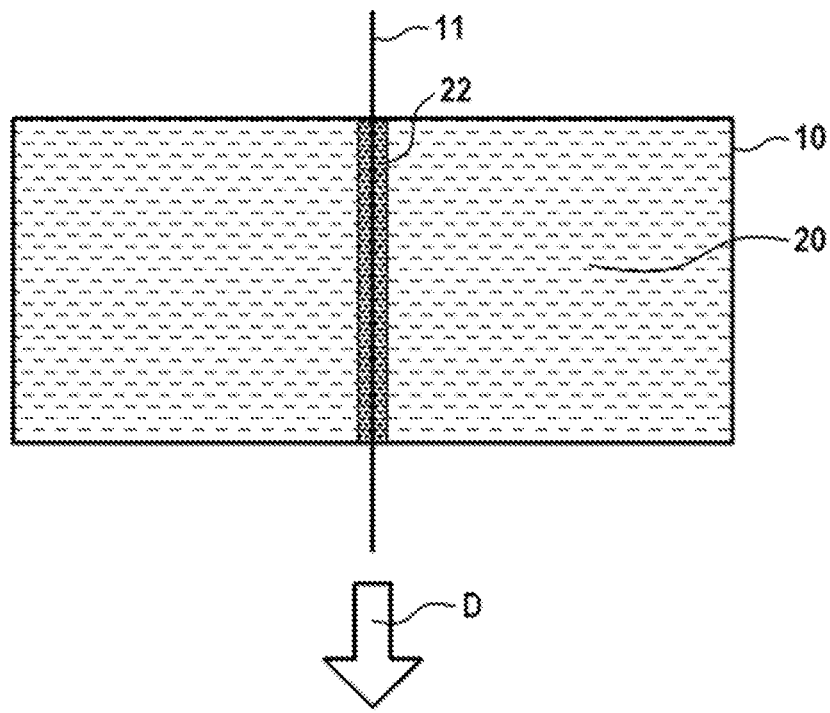
[Fig. 2]
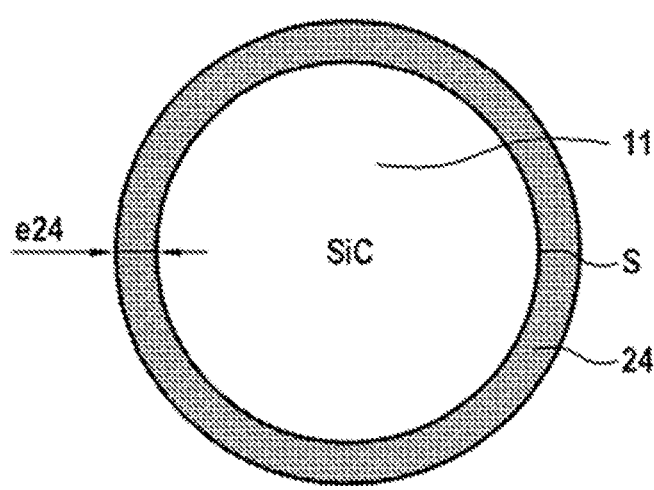

[Fig. 3]
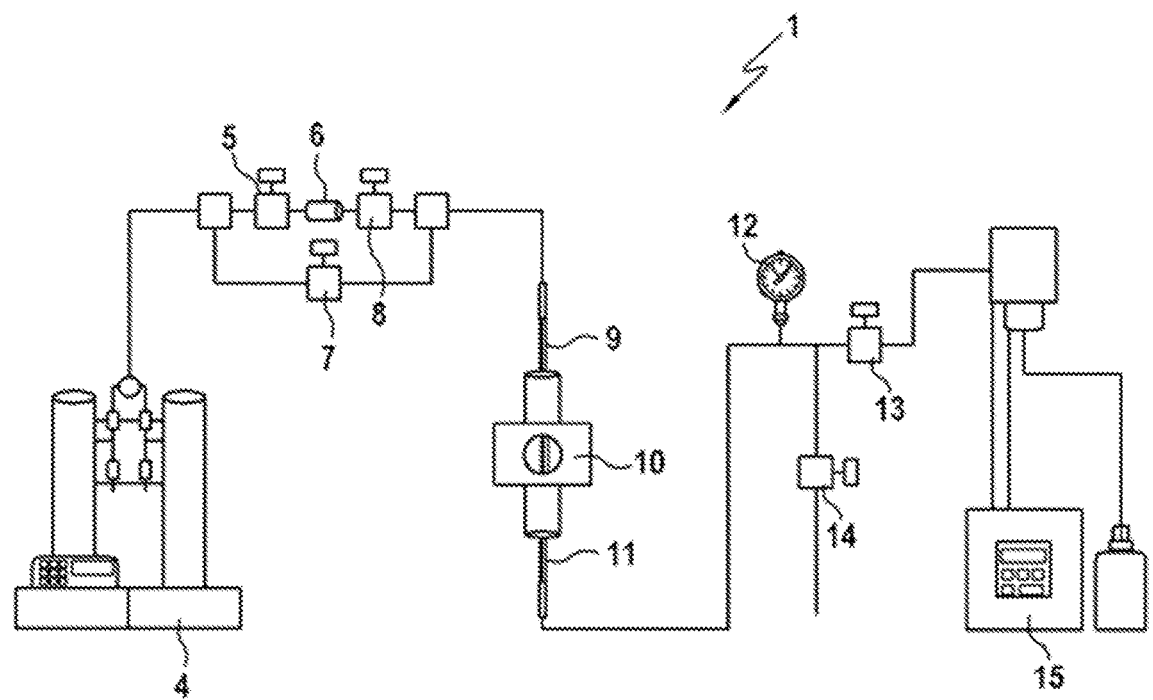
[Fig. 4]
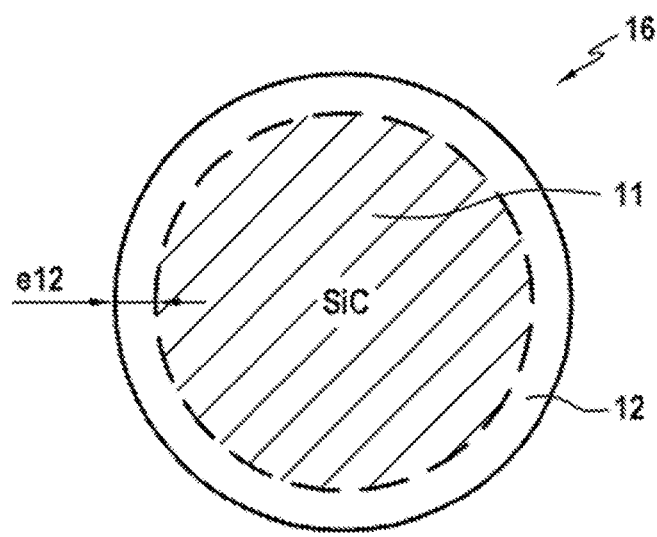

[Fig. 5]
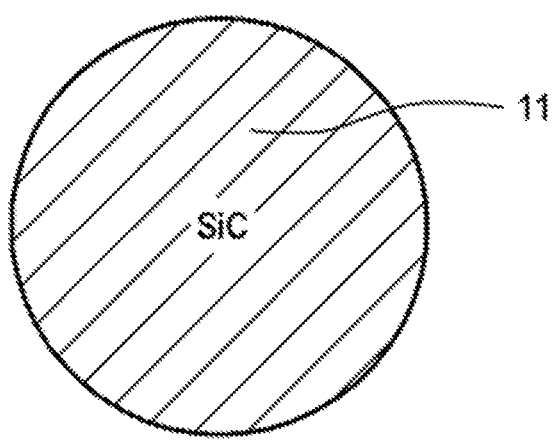

METHOD FOR COATING AT LEAST ONE FIBER WITH A BORON NITRIDE INTERPHASE

CROSS-REFERENCE TO RELATED APPLICATIONS

This application is the U.S. National Stage of PCT/FR2022/051129, filed Jun. 13, 2022, which in turn claims priority to French patent application number 21 06671 filed Jun. 23, 2021. The content of these applications are incorporated herein by reference in their entireties.

TECHNICAL FIELD

The present invention relates to a method for treating at least one fibre, in particular made of ceramic and for example made of silicon carbide, enabling it to be coated by a boron nitride (BN) interphase.

PRIOR ART

Ceramic matrix composite materials ("CMC materials") have good mechanical properties, making them suitable for forming structural elements and advantageously keeping these properties at high temperatures. They are an interesting alternative to commonly used metal parts, because they allow lightening of the structure.

A CMC material can be produced by forming a fibrous preform, the shape of which is similar to that of the final part, which is then densified by a ceramic matrix. The function of a CMC material requires specific management of the interfacial bonds between fibres and matrix, in order to obtain the hard-to-damage nature of the final composite. This modulation of the interfaces is conventionally obtained by positioning an interphase between the fibre and the matrix. In the context of thermostructural applications, the use of boron nitride for the interphase may be favoured in comparison with pyrolytic carbon (PyC), because of its more advantageous oxidation behaviour.

The boron nitride interphase can be deposited on the fibres of an already obtained preform by chemical vapour infiltration (CVI). This technique has relatively slow deposition kinetics, which increases the manufacturing time as well as its cost. A problem with the CVI technique is the mass transfer of reactive species to the core of the substrate, which can limit the deposition kinetics. Furthermore, the CVI technique can induce different reactivity in the core and at the outside of the preform, which can lead to heterogeneities in the obtained materials. Boron nitride can be obtained by CVI starting from boron trichloride ($BCl_3$) or boron trifluoride ($BF_3$), which are toxic compounds. Alternative precursors, such as alkylboranes, have carbon atoms in their structure and can lead to carbon contamination in the interphase deposit.

It is desirable to have methods for forming a boron nitride interphase, avoiding the use of boron trichloride and boron trifluoride and limiting contamination in the deposit. In addition, it is desirable that the methods have a higher deposition kinetics than the CVI method, while producing a homogeneous coating.

DISCLOSURE OF THE INVENTION

The present invention relates to a method for coating at least one fibre with a boron nitride interphase, comprising treating said at least one fibre with a treatment medium containing ammonia borane and having a temperature greater than or equal to 100° C. and a pressure greater than or equal to 1 bar.

The use of the treatment medium makes it possible to obtain higher formation kinetics of the boron nitride interphase than in the CVI technique, by avoiding, in particular, mass transfer phenomena encountered in this latter method. The invention proposes the use of ammonia borane (with chemical formula $BH_3NH_3$) as the precursor of the boron nitride to be obtained in order to produce the interphase. Ammonia borane does not present any particular danger during use and is a stable solid compound under ambient conditions. The formation of the boron nitride interphase is thus simplified and made safer compared with conventional CVI techniques. The interphase is formed by decomposition of ammonia borane under the effect of temperature. This decomposition can be used to obtain hexagonal boron nitride and releases molecular hydrogen. The molecular hydrogen produced by the decomposition of ammonia borane does not present any major toxicity or safety risk. Moreover, this type of reactivity is part of a sustainable chemistry development, in particular at the level of atom economy. In addition, the choice of ammonia borane makes it possible, in particular, to avoid the use of carbon-containing precursors, such as alkylboranes, thus avoiding the introduction of contamination in the boron nitride interphase that is formed. The treatment medium can be in a liquid, gaseous or supercritical state.

In an exemplary embodiment, the treatment medium comprises ammonia borane dissolved in ammonia ($NH_3$).

Such a feature is advantageous because ammonia borane has a high solubility in ammonia. Nevertheless, the invention is not limited to the use of ammonia as solvent for ammonia borane for the treatment medium. It is possible to alternatively use tetrahydrofuran (THF) (critical temperature: 267° C. and critical pressure: 51.9 bar) as a solvent for ammonia borane, optionally with ammonia as co-solvent in order to promote nitriding conditions.

In particular, especially in the case where ammonia is used as a solvent for ammonia borane, the temperature of the treatment medium can be greater than or equal to 600° C., for example between 600° C. and 1600° C., and the pressure of the treatment medium can be greater than or equal to 10 bar, for example between 10 bar and 300 bar.

More particularly, especially in the case where ammonia is used as a solvent for ammonia borane, the temperature of the treatment medium is between 800° C. and 1600° C., for example between 900° C. and 1600° C., and the pressure of the treatment medium is between 100 bar and 150 bar.

These conditions constitute a compromise making it possible to take advantage of the high solubility of ammonia borane while benefiting from improved mass transfer and thus higher deposition kinetics. Furthermore, these pressures are possible for an industrial development of the method.

In an exemplary embodiment, said at least one fibre is heated by microwaves during the treatment.

The microwave field can take the surface of the treated fibre to a sufficiently high temperature so as to locally reach the desired conditions and induce the decomposition of ammonia borane. The microwave field can heat the entire fibre in order to ensure homogeneous formation of the interphase. In addition, the energy necessary for forming the interphase is reduced, because the fibre is heated directly rather than the entire treatment chamber. Nevertheless, it does not go beyond the scope of the invention if another heating means is used, such as radiation from a susceptor.

In an exemplary embodiment, said at least one fibre moves through a treatment chamber during the treatment. The movement of the fibre in the treatment chamber can take place in the same direction or counter-current with respect to a circulation of the treatment medium.

The use of the treatment medium which makes it possible to avoid the limitations due to mass transfer and to accelerate the deposition kinetics is particularly advantageous for carrying out continuous deposition on a fibre moving through the treatment chamber, and thus strongly improving the rate of formation of the interphase.

In an exemplary embodiment, said at least one fibre is made of ceramic or carbon. In particular, said at least one fibre can be made of silicon carbide having an oxygen content less than or equal to 1% in atomic percent.

In particular, the treatment can be carried out in a treatment chamber and said at least one fibre is made of silicon carbide, and said at least one fibre having been able to undergo, before the treatment, a pretreatment for removing a surface layer of the fibre, in the treatment chamber, by placing it in contact with an ammonia phase at a temperature greater than or equal to 100° C. and at a pressure greater than or equal to 1 bar.

In this case, the fibre is pretreated in order to remove a surface layer which can reduce the quality of adhesion of the fibre to the boron nitride interphase. This feature uses an ammonia phase and is carried out in the same chamber as the coating by the boron nitride interphase, which makes it possible to remove the steps of manipulating the treated fibre, thus simplifying the method and thus reducing its duration.

In particular, the temperature of the ammonia phase can be greater than or equal to 600° C., for example between 600° C. and 1600° C., and the pressure of the ammonia phase can be greater than or equal to 1 bar, for example between 1 bar and 300 bar. The ammonia phase can be in the gaseous, liquid or supercritical state.

The invention also relates to a method for manufacturing a composite material part, comprising at least the formation of a matrix in the pores of a fibrous reinforcement, the fibres of the fibrous reinforcement having been coated with a boron nitride interphase by implementing a method such as that described above.

It will be noted that the fibrous reinforcement can be obtained after coating a plurality of fibres by the interphase in the manner described above. Alternatively, the fibrous reinforcement can first be formed from a plurality of fibres, then this reinforcement is treated by the treatment medium so as to form the interphase on the fibres.

The composite material part can, for example, be a turbomachine part, for example a turbomachine blade or vane or a turbine ring segment.

BRIEF DESCRIPTION OF THE DRAWINGS

FIG. 1 schematically represents the treatment of a fibre in a treatment chamber in the context or an example of the method according to the invention.

FIG. 2 is a sectional view schematically representing the structure of the treated fibre coated by the boron nitride interphase.

FIG. 3 schematically represents an example of a treatment installation that can be used for implementing the method according to the invention.

FIG. 4 is a sectional view schematically representing the structure of a silicon carbide fibre, initially having a surface layer.

FIG. 5 is a sectional view schematically representing the structure of the silicon carbide fibre of FIG. 4 after removal of the surface layer and before depositing the boron nitride interphase.

DESCRIPTION OF THE EMBODIMENTS

FIG. 1 represents the treatment of a fibre 11 enabling it to be coated with a boron nitride interphase in the context of an example of the method according to the invention.

In the considered example, the fibre 11 moves through a treatment chamber 10 in the direction indicated by the arrow D in FIG. 1, during the treatment. The deposition of the interphase in the treatment chamber 10 can be carried out continuously, without interrupting the movement of the fibre 11. Alternatively, it is possible to treat the fibre segment by segment, the segment to be treated being immobilised in the treatment chamber 10 and the interphase being deposited on this segment, an adjacent fibre segment 11 then being introduced into the chamber 10 so as to carry out the deposition on this adjacent segment. The treated fibre 11 is unwound from a reel (not shown), passes into the treatment chamber 10 and is then wound onto a reel after treatment. The speed of travel of the fibre 11 in the treatment chamber 10 can be between 0.1 cm/s and 50 cm/s.

The treatment chamber 10 is filled by a fluid medium 20 comprising ammonia borane. The ammonia borane can be dissolved in the fluid medium 20. The fluid medium 20 may comprise a solvent of ammonia borane, such as ammonia. The fluid medium 20 can essentially consist of ammonia borane and a solvent of ammonia borane. Advantageously, the fluid medium 20 is devoid of any atom other than B, N and H and in particular devoid of carbon, so as to avoid any risk of contamination in the interphase deposit. The fluid medium 20 can be in liquid form. The fluid medium 20 can be pressurised, for example at a pressure greater than or equal to the critical pressure of the solvent. The fibre 11 is immersed in the fluid medium 20 during its treatment in the treatment chamber 10. In the illustrated example, the fibre 11 is heated directly, for example by application of a microwave field. Heating makes it possible to obtain a high temperature, at least in the vicinity of the fibre 11, in order to obtain the treatment medium 22 by taking, for example, the fluid medium 20 to supercritical conditions. The direct heating employed for the fibre 11 can induce the decomposition of ammonia borane on contact with the thus heated fibre 11, and form the boron nitride interphase.

The fluid medium 20 can move continuously through the treatment chamber 10, or alternatively the treatment chamber 10 can be initially filled with the fluid medium 20 and the treatment can then be carried out without the fluid medium 20 being introduced into the chamber or evacuated. In the case where there is a continuous circulation of the fluid medium, during all or part of the treatment it is possible to impose a ratio [flow of fluid medium introduced into the chamber]/[volume of the chamber] greater than or equal to 0.00016 $s^{-1}$, for example between 0.00016 $s^{-1}$ and 0.16 $s^{-1}$ or between 0.0016 $s^{-1}$ and 0.016 $s^{-1}$ or between 0.0016 $s^{-1}$ and 0.16 $s^{-1}$. For example, for a treatment chamber 10 having a volume between 0.1 mL and 100 mL, the fluid medium 20 can be introduced into the chamber 10 during all or part of the treatment with a flow rate between 0.1 mL/minute and 10 mL/minute, for example between 0.1 mL/minute and 3 mL/minute. In general, the molar concentration of ammonia borane in the fluid medium 20 can be greater than or equal to 0.001 mol/L, for example between 0.001 mol/L and 10 mol/L.

In order to carry out the interphase deposition, the fibre 11 can be placed in contact with the pressurised fluid medium 20 which comprises ammonia borane. In the case where ammonia is used as a solvent, the fibre 11 can be placed in contact with the fluid medium comprising a mixture of ammonia and ammonia borane at a pressure between 1 bar and 300 bar, for example between 10 bar and 300 bar, for example between 100 bar and 150 bar. The heating of the fibre 11 is then initiated. Thus, the treatment medium 22 is formed at least in the vicinity of the fibre 11. The fluid medium 20 is taken, at least in the vicinity of the fibre, to a sufficient temperature to decompose the ammonia borane and form boron nitride. For example, in the case where ammonia is used as a solvent, the fluid medium 20 can be taken, at least in the vicinity of the fibre, to a temperature greater than or equal to 600° C., for example greater than or equal to 800° C. or greater than or equal to 900° C. This temperature can be between 600° C. and 1600° C. or between 800° C. and 1600° C. or between 900° C. and 1600° C.

A boron nitride interphase 24 is thus obtained, deposited in contact with the surface S of the fibre 11. The interphase 24 can have a thickness e24 greater than or equal to 1 nm, for example greater than or equal to 10 nm. This thickness e24 can be between 10 nm and 1 mm, for example between 10 nm and 10 µm.

The interphase 24 obtained has a controlled and homogeneous thickness over the entire circumference of the treated fibre, with a stoichiometric ratio of boron:nitrogen close to unity. The boron nitride obtained can be crystalline. The use of a crystalline material is advantageous in order to increase the crack deflection properties. It is possible to obtain a hexagonal boron nitride interphase.

The duration of the coating treatment by boron nitride interphase can be greater than or equal to 10 seconds, for example between 10 seconds and 30 minutes, for example between 1 minute and 10 minutes.

Once the interphase is deposited, the treatment chamber 10 can be cleaned by injection of pressurised solvent. It is possible, for example, to inject liquid ammonia at a flow rate between 0.5 mL/minute and 10 mL/minute, in order to remove the excess ammonia borane that has not reacted.

The treated fibre 11 can be made of ceramic or carbon. The fibre 11 can be made of silicon carbide, optionally having an oxygen content less than or equal to 1% in atomic percent. Such fibres include, for example, the fibres marketed under the name "Hi-Nicalon S" or "Hi-Nicalon". Alternatively, Si—C—O fibres can be treated, which have a higher oxygen content. Such fibres include, for example, the fibres marketed under the name "Nicalon.

An example of a method according to the invention has just been described, in which one fibre 11 is treated. However, it would of course not go beyond the scope of the invention if a plurality of fibres were treated simultaneously, so as to form the interphase 24 on each of them. It will be noted that each fibre can be in the form of a roving comprising a plurality of filaments. It also does not go beyond the scope of the invention if the interphase is no longer formed on one fibre or a plurality of fibres that are not connected together, but on an already formed texture comprising a plurality of fibres, that is mobile or immobile in the treatment chamber. Hence, the fibres can be treated in any form whatsoever, for example threads, rovings, strands, cables, fabrics, felts, mats and even two or three-dimensional textures. The fibres treated according to the method of the invention can advantageously be used to produce fibrous preforms of a composite material part. The conditions which have been described above for the deposition of the interphase remain applicable whatever the form in which the fibre or fibres are treated.

FIG. 3, which will be described in the following, illustrates, more completely, an example of an installation which can be used in order to implement a method according to the invention.

The installation 1 illustrated in FIG. 3 comprises a syringe pump 4, which can work at constant flow rate or constant pressure. It further comprises a device for generating microwaves able to heat the fibre 11 by means of this radiation, as well as a tube 9 made of material transparent to microwaves and containing the fibre 11 to be heated. The installation 1 comprises a pressure regulator 15 which can fix the pressure throughout the device when the syringe pump operates at constant flow rate.

In order to carry out the treatment of the fibre 11 so as to remove the boron nitride interphase, the tank 6 is initially filled with ammonia borane then connected to the remainder of the device. The syringe pump 4 is filled with the solvent and cooled by means of a cryostat. The syringe pump 4 is then opened, valves 7, 8, 13 and 14 being closed. The syringe pump functions at constant pressure and thus fills the reservoir 6 with ammonia at working pressure. The valve of the tank 5 is then closed and valve 7 opened, which places the entire device under pressure. Then, valve 13 is opened and the syringe pump is used in constant flow mode. The pressure is then fixed by means of the pressure regulator 15.

Once the pressure in the system is stabilised, valve 7 is closed and the valve of the tank 5 and valve 8 are opened in order to inject the solution composed of ammonia borane and solvent into the treatment chamber 10. When the constant flow rate operation is stabilised, the microwave heating device is used to bring the fibre 11 contained in the chamber 10 to working temperature during a given time. When all of the precursor has been injected, pressurised solvent is injected (by means of the syringe pump) in order to remove any traces of precursor which may remain.

The coating of a fibre by a boron nitride interphase has just been described together with an example of a facility enabling this method to be implemented. The following attempts to describe an optional embodiment in conjunction with FIGS. 4 and 5, in which a pretreatment of the fibre is carried out so as to remove a surface layer in order to improve the bond with the boron nitride interphase.

FIG. 4 illustrates, very schematically, the cross-section of a silicon carbide fibre 16, before pretreatment, which can have an oxygen content less than or equal to 1% in atomic percent. The fibre 16 has a surface layer 12 comprising a silicon oxycarbide (composed of silicon, carbon and oxygen) and/or carbon, which it is preferable to remove before deposition of the boron nitride interphase 24. The thickness e12 of the surface layer 12 can be generally between 1 nm and 1 mm, for example between 1 nm and 1 µm. The silicon carbide fibre 16 consists of a silicon carbide core 11 and a surface layer 12 located in the vicinity of the surface of the fibre 16. The surface layer 12 has a heterogeneous surface state. The surface layer 12 can be responsible for a reduction in the quality of the adhesion of the fibre to a coating covering it.

The surface layer 12 can be removed by placing fibre 16 in contact with an ammonia phase at a temperature between 600° C. and 1600° C. and a pressure between 1 bar and 300 bar. As described above, the fibre 16 can first be placed in contact with pressurised ammonia, at a pressure between 1 bar and 300 bar, then heating of the fibre can be carried out and continued until removal of the surface layer 12. Ammonia may or may not be continuously injected into the chamber 10 during the pretreatment. In the case where there is a continuous circulation of the fluid medium comprising ammonia, during all or part of the treatment, it is possible to impose a ratio [flow of fluid medium introduced into the chamber]/[volume of the chamber] greater than or equal to 0.00016 s$^{-1}$, for example between 0.00016 s$^{-1}$ and 0.16 s$^{-1}$ or between 0.0016 s$^{-1}$ and 0.16 s$^{-1}$ or between 0.0016 s$^{-1}$ and 0.016 s$^{-1}$. The surface carbon of the fibre 16 can react with ammonia to form hydrogen cyanide (HCN) which is removed. The oxycarbide compounds are also removed by the ammoniacal medium. Thus, the fibre 11 is obtained with an improved surface state, which is then intended to be coated by the boron nitride interphase 24, as described above. The duration of the pretreatment can be greater than or equal to 10 seconds, for example between 5 minutes and 30 minutes. The advantage of this pretreatment is to carry out the step of removing heterogeneities and interphase coating in the same chamber 10, which makes it possible to avoid a return to ambient air of the fibre and reducing the manipulations. In addition, in the case where the solvent of ammonia borane is ammonia, the fact of using the same medium for the pretreatment and as the solvent, makes it possible to remove any problem of chemical compatibility between the two steps.

The treatment has just been described for coating by a boron nitride interphase having optionally carried out before this coating step a pretreatment aiming to remove the surface heterogeneities of the fibre or fibres. The following endeavors to describe the rest of the method for obtaining a composite material part from fibres thus treated.

Fibres obtained after treatment described above can then be used to form a fibrous preform of the part to be obtained. The formation of the fibrous preform uses textile operations which are known per se, for example weaving, optionally three-dimensional weaving. Thus, the preform can for example have an "interlock" weave, in other words a weave in which each layer of weft yarns links a plurality of layers of warp yarns, with all the yarns of the same weft column having the same movement in the weave plane. Other types of three-dimensional weaving can of course be used in order to produce the preform. As indicated above, it does not go beyond the scope of the invention if the preform is first formed from fibres, then the boron nitride interphase is deposited as described above on the fibres of the preform thus obtained.

The method can proceed by the formation of at least one matrix phase in the pores of the fibrous preform, the fibres of which are coated with the boron nitride interphase. The matrix obtained can be at least partially made of ceramic, for example mainly made of ceramic substance, for example entirely made of ceramic. The formation of the matrix uses techniques which are known per se, being for example carried out by a liquid densification (impregnation by a precursor resin of the matrix and transformation by cross-linking and pyrolysis, the process being repeatable) or a gaseous technique (chemical vapour infiltration of the matrix), or even by melt infiltration (MI).

The invention applies, in particular, to the production of parts made of ceramic matrix composite material formed by a fibrous reinforcement with silicon carbide fibres densified by a ceramic matrix, in particular refractory carbide, nitride or oxide. Typical examples of such CMC materials are SiC—SiC materials (reinforcement made of silicon carbide fibres and matrix made of silicon carbide).

The part obtained can be an aeronautical or industrial turbomachine part. This part can be a turbomachine blade or vane or a turbine ring segment, for example.

EXAMPLE

A fibre was passed through a treatment chamber 10, shown schematically in FIG. 1, which had a volume of 1 cm$^3$. The treated fibre was a silicon carbide fibre having an oxygen content less than or equal to 1% in atomic percent, corresponding to a fibre marketed under the name "Hi-Nicalon S". The fibre had, on its surface before treatment, a surface layer 12 having a thickness of approximately 100 nm. A pretreatment step of the fibre was carried out first, by subjecting it in the chamber 10 to a supercritical ammonia phase. During the pretreatment, the fibre was heated by a microwave field enabling the temperature to be taken to 1000° C. and the supercritical ammonia phase was taken to a pressure of 120 bar. Ammonia was injected continuously into the treatment chamber during the pretreatment with a flow rate of 6 mL/min and the fibre was moved at a speed of 30 cm/minute. A surface stripped of silicon carbide was thus obtained, as shown in FIG. 5.

The boron nitride interphase was then deposited on the thus stripped fibre, in the same treatment chamber. During this deposition, the fibre moved in the treatment chamber at a speed of 30 cm/minute. A mixture of ammonia and ammonia borane, present at a molar concentration of 1 mol/L in the mixture, was introduced continuously into the treatment chamber with a flow rate of 1 mL/min. During the treatment, the surface of the fibre was taken to a temperature of 1100° C. by the microwave field and the fluid medium was at a pressure of 120 bar. The treatment was carried out during a period of 15 minutes and a BN interphase of 1000 nm was obtained in this way on the surface of the silicon carbide fibre.

The expression "between . . . and . . . " should be understood as including the limits.

The invention claimed is:

1. A method for coating at least one fibre with a boron nitride interphase, comprising treating said at least one fibre with a treatment medium containing ammonia borane and having a temperature greater than or equal to 100° C. and a pressure greater than or equal to 1 bar, wherein the treatment medium comprises ammonia borane dissolved in ammonia.

2. The method according to claim 1, wherein the temperature of the treatment medium is greater than or equal to 600° C., and the pressure of the treatment medium is greater than or equal to 10 bar.

3. The method according to claim 2, wherein the temperature of the treatment medium is between 800° C. and 1600° C., and the pressure of the treatment medium is between 100 bar and 150 bar.

4. The method according to claim 1, wherein said at least one fibre is heated by microwaves during the treatment.

5. The method according to claim 1, wherein said at least one fibre moves through a treatment chamber during the treatment.

6. The method according to claim 1, wherein said at least one fibre is made of ceramic or made of carbon.

7. The method according to claim 6, wherein the treatment is carried out in a treatment chamber and said at least one fibre is made of silicon carbide, and wherein said at least one fibre has undergone, before the treatment, a pretreatment for removing a surface layer of the fibre, in the treatment chamber, by placing it in contact with an ammonia phase at a temperature greater than or equal to 100° C. and at a pressure greater than or equal to 1 bar.

8. The method according to claim 7, wherein the temperature of the ammonia phase is between 600° C. and 1600° C., and the pressure of the ammonia phase is between 1 bar and 300 bar.

9. A method for manufacturing a composite material part, comprising at least the formation of a matrix in the pores of a fibrous reinforcement, the fibres of the fibrous reinforcement having been coated with a boron nitride interphase by implementing a method according to claim 1.

* * * * *